(12) United States Patent
Becherucci

(10) Patent No.: US 6,226,857 B1
(45) Date of Patent: *May 8, 2001

(54) METHODS FOR BALANCING ELECTRIC MOTORS

(75) Inventor: Raffaele Becherucci, Florence (IT)

(73) Assignee: Axis USA, Inc., Tampa, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,662

(22) Filed: Sep. 22, 1998

Related U.S. Application Data

(60) Provisional application No. 60/087,189, filed on May 29, 1998, and provisional application No. 60/078,868, filed on Mar. 20, 1998.

(51) Int. Cl.⁷ .................................................. H02K 15/16
(52) U.S. Cl. ........................ 29/598; 29/732; 29/564.6; 29/564.8
(58) Field of Search .................... 29/596, 598, 732, 29/735, 564.4, 564.6, 564.8; 310/214, 215

(56) References Cited

U.S. PATENT DOCUMENTS

| | | | |
|---|---|---|---|
| 3,468,019 | * 9/1969 | Brown et al. | 29/596 |
| 4,644,201 | 2/1987 | Tani et al. | 310/51 |
| 5,258,681 | * 11/1993 | Hibino et al. | 310/214 |
| 5,383,619 | 1/1995 | Cardini et al. | 242/70.5 B |
| 5,498,916 | * 3/1996 | Lindner et al. | 310/214 |
| 5,572,787 | * 11/1996 | Cardini et al. | 29/598 |
| 5,576,585 | * 11/1996 | Cardini et al. | 310/51 |
| 5,821,652 | * 10/1998 | Hyypio | 310/83 |

FOREIGN PATENT DOCUMENTS

| | | | |
|---|---|---|---|
| 57-000054 | 1/1982 | (JP) | H02K/15/16 |
| 57-046661 | 3/1982 | (JP) | H02K/19/28 |
| 60-066653 | 4/1985 | (JP) | H02K/15/16 |
| 62-171442 | 7/1987 | (JP) | H02K/15/16 |
| 02201236 | 8/1990 | (JP) | G01M/1/32 |
| 09149570 | 6/1997 | (JP) | H02K/1/22 |

* cited by examiner

*Primary Examiner*—Carl E. Hall
(74) *Attorney, Agent, or Firm*—Fish & Neave; Robert R. Jackson; Walter M. Egbert, III

(57) ABSTRACT

The balancing of rotors for dynamo-electric machines (e.g., electric motor armatures) is achieved by attaching a balancing strip to the rotor after an impregnation resin has been applied to the wire coils, and the unbalance of the rotor has been measured. To create the balancing strip, a material supply selectively and incrementally delivers a predetermined quantity of material, such that the quantity of material has a mass sufficient to compensate for the measured unbalance of the rotor. The predetermined quantity of material is separated from the material supply to form a balancing mass, and the balancing mass attached to the rotor to compensate for the measured unbalance. A mounting member having a recess may be preliminarily attached to the rotor for subsequent attachment of the balancing mass thereto. A second material supply may be provided such that a controller can select between the first and second material supplies.

11 Claims, 3 Drawing Sheets

METHODS FOR BALANCING ELECTRIC MOTORS

CROSS-REFERENCE TO RELATED APPLICATION

This application claims the benefit of United States provisional patent application No. 60/078,868, filed Mar. 20, 1998, and United States provisional patent application No. 60/087,189, filed May 29, 1998.

BACKGROUND OF THE INVENTION

This invention relates to manufacturing rotors or armatures for dynamo-electric machines such as motors, generators, and alternators that have been wound with coils of wire. Such armatures are typically wound by means of winders like those described in commonly-assigned U.S. Pat. No. 5,383,619 to Cardini et al., although it will be understood that the invention is equally applicable to armatures which have been wound by other types of winders.

It is common practice in the art to use automatic balancing machines at the end of a rotor production line to determine how unbalanced the rotor has become during the processing stages and to correct for this unbalanced condition by cutting away portions of the rotor stack to correctly distribute the masses around the longitudinal axis and the length of the rotor.

It would be desirable, however, to balance the rotor in a way that does not require the removal of large amounts of material from the outer surface of the rotor stack by milling or turning. The machining of material from an assembled rotor may disturb assembled component parts and may reduce the efficiency of the motor.

Another technique for balancing armatures involves the application of a resin material to the coils. The resin is applied in droplets to the armature at several locations to correct for the unbalance.

This approach has several drawbacks. The mass and placement of the droplet of resin are critical to correct for rotor unbalance. However, it is difficult to dispense the exact amount of liquefied resin at the correct location without spilling or spreading to undesired locations. This approach also adds costly and time-consuming manufacturing steps, e.g., heating the resin to a liquid state, precisely dispensing the liquefied resin, and subsequently curing the resin to a hardened state.

A final technique involves attaching balancing masses to the armature after the coils have been wound, and prior to the impregnation of the coils with resin. After the balancing masses are attached, the impregnation resin is applied to the both the coils and the balancing masses.

This technique also presents several disadvantages. First, prior to impregnation with resin, the wound coils do not offer a stable base for mounting a balancing mass. The individual wires in the coil are able to shift significantly, which may make it difficult to securely mount the balancing mass to the wires. For example, adhesives used to attach the balancing mass may break as a result of wire shifting, thereby causing the mass to change position or to detach from the rotor entirely.

Secondly, the technique of measuring the unbalance of the rotor and adding balancing masses prior to the impregnation with resin may not be effective to balance the rotor. The resin adds mass to the rotor which may significantly change its balance characteristics. Therefore, the impregnation step may introduce additional unbalance to the rotor, which would require repeating one of the techniques described above.

In view of the foregoing it is an object of the invention to provide improved methods and apparatus for balancing rotors.

It is a further object of the invention to provide methods and apparatus for producing and attaching precision balancing masses to compensate for unbalances in the rotor.

SUMMARY OF THE INVENTION

These and other objects are accomplished in accordance with the principles of this invention by the provision of apparatus and methods for balancing a rotor of a dynamo-electric machine having a measured mass unbalance. A material supply is configured to selectively and incrementally deliver material. A material transport mechanism is provided to deliver a predetermined quantity of material from the material supply. The predetermined quantity of material is selected to have sufficient mass to compensate for the measured unbalance of the rotor. A dividing member separates the predetermined quantity of material from the material supply to form a balancing mass. A mounting member configured for attachment to a predetermined location on the rotor is provided with a recess for attachment of the balancing mass thereto. In a preferred embodiment, the predetermined quantity of material is a length dimension. The balancing mass may be an elongated strip of material configured for mounting within a slot of the rotor. The dividing member may be a cutting tool. Preferably, the mounting member is an elongated cylindrical member having a rectangular recess and mounted in one of the slots of the rotor.

In another embodiment, a second material supply is provided having material with a different cross-section than the first material supply. A controller is provided to select between the first and second material supply, and to determine a corresponding length for the balancing mass.

BRIEF DESCRIPTION OF THE DRAWINGS

The above and other features of this invention, its nature, and various advantages will be apparent from the following detailed description of the preferred embodiments, taken in conjunction with the accompanying drawings, in which like reference characters represent like elements throughout, and in which.

DETAILED DESCRIPTION OF THE PREFERRED EMBODIMENTS

Figure 1:
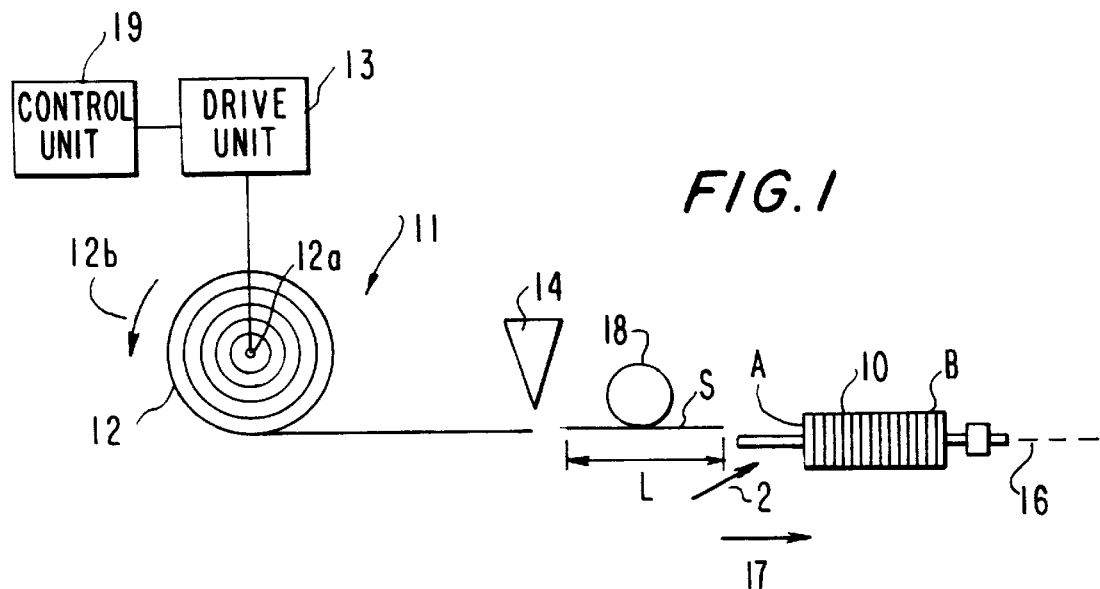
FIG. 1 is a simplified schematic representation of an illustrative embodiment of the apparatus in accordance with this invention.

Referring now in detail to the drawings, a preferred embodiment of the subject invention is illustrated in FIG. 1. A rotor or armature 10 awaiting balancing is positioned in alignment with balancing unit 11. It is preferable to measure the unbalance after the armature has been wound with coils and impregnated with a resin. This is convenient because the coil turns and the leads are permanently positioned due to the bonding action of the impregnation resin. The coils are thus able to provide a stable base for the positioning of balancing masses, as will be described below. Furthermore, measuring the mass-distribution characteristics of the armature after impregnation is more accurate because the impregnation resin adds mass to the armature and may significantly change the balance characteristics.

The balancing unit 11 includes a supply of material mounted on a reel 12. Suitable materials include copper, insulated copper, tin, bronze, or other similar materials which avoid interference with the electric and magnetic characteristics of a completed motor or electromechanical device in which the armature will be assembled. The material may be configured as an elongated strip and the cross-section of the strip material may be circular. A typical strip material may be a wire. Alternatively, the cross-section may be elliptical, rectangular, trapezoidal or any other shape known in the art. The strip material may alternatively be mounted on a spool, cartridge, or another storage device that permits selective and incremental delivery of the strip material therefrom.

Reel 12 is mounted for rotation about a center axis 12a. A material transport mechanism may be drive unit 13, used to rotate reel 12 about the center axis 12a in direction 12b, thereby selectively and incrementally unwinding a length of the strip material from the reel. Consequently, the strip material is advanced a predetermined length L beyond a cutting device 14.

The predetermined length L is selected to compensate for the measured unbalance characteristics of the armature 10. The armature 10 may be measured and weighed by methods known in the art to determine the extent and location of unbalance after the coil has been wound. The strip material stored on reel 12 has a known section and thus a measured linear density, or mass-per-unit-length. Consequently, a predetermined length L of the strip material is selected to produce a mass equal to a value required to balance the armature. Drive unit 13 is controlled to precisely unreel such a predetermined length. For accuracy, drive unit 13 may be numerically controlled by control equipment 19 in order to regulate the deployment of material necessary to deploy the predetermined length of material. Once the predetermined length L of strip material has been advanced, it is separated from the reel by a dividing tool, such as cutting device 14, to become a balancing mass, or strip S. Cutting device 14 may also be automatically controlled by an automatic controller, such as control unit 19.

Figure 2:
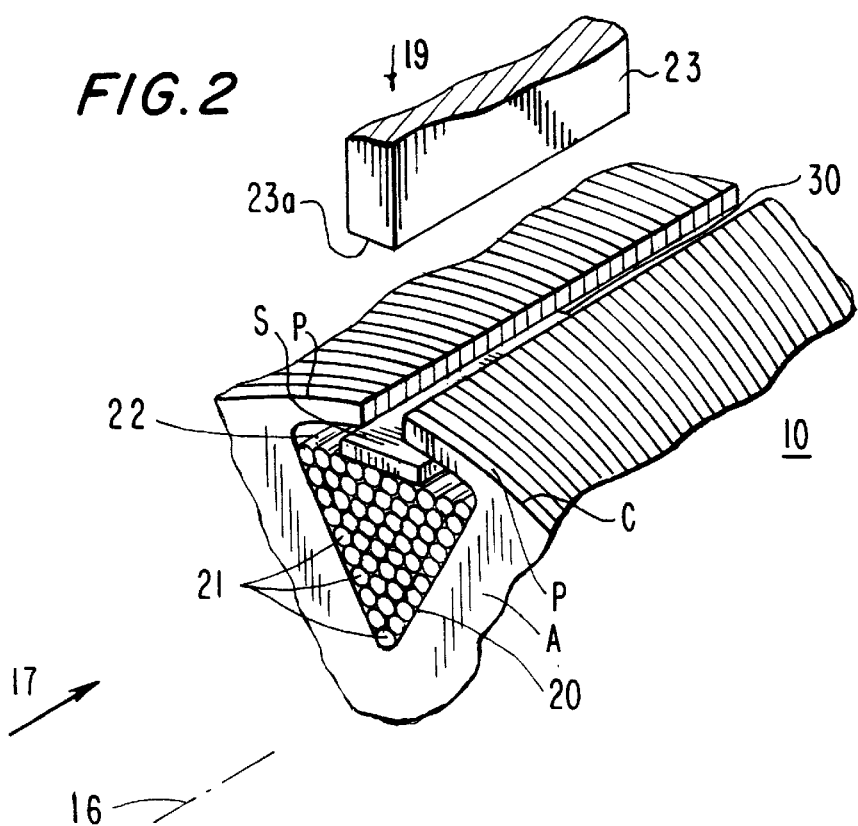
FIG. 2 is a simplified fragmentary perspective view of a portion of the subject apparatus, as viewed from direction 2 of FIG. 1
Figure 3:
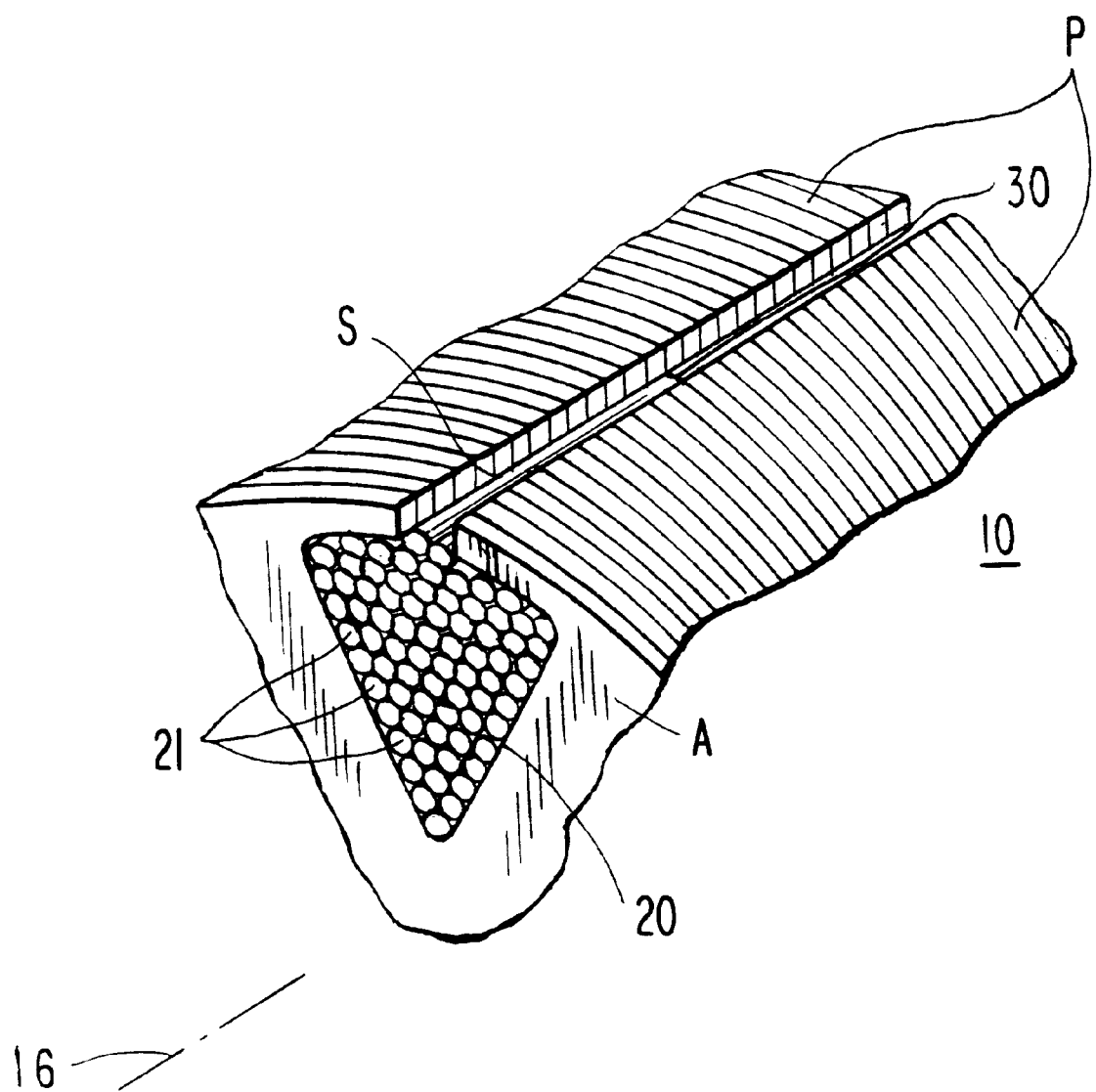
FIG. 3 is a simplified fragmentary perspective view similar to FIG. 2, illustrating an alternative embodiment of the subject invention.

The armature 10 is aligned in front of the balancing unit 11 to receive balancing mass S in a slot where the coils of wire have been wound, as shown in FIGS. 2 and 3.

FIGS. 2 and 3 are fragmentary perspective views of the armature stack, which defines longitudinal axis 16 and has end faces A and B (see, FIG. 1) substantially perpendicular to axis 17 and a circumferential surface C substantially parallel to axis 16. A typical slot 20 in which a plurality of turns 21 of the coil have been wound is illustrated in FIG. 2. Slot 20 defines an opening in end face A (and B) and in circumferential surface C.

Balancing strip S is mounted to the armature 10. Preferably, strip S is mounted in slot 20 such that the installed strip S does not protrude beyond the circumferential surface C of the stack. This permits the armature 10 in the assembled motor to rotate freely with respect to the stator and other motor components and avoids interference with the magnetic gap of the final motor. Balancing strip S is positioned in slot 20 adjacent the topmost turns 21 of the coils. The armature 10, illustrated in FIG. 2, receives strip S, by moving the latter in direction 17, substantially parallel to the longitudinal axis 16 of the armature, into space 22 above the turns of the coils. The balancing strip S enters space 22 by passing through end face A of the armature stack. Mass S may be pushed for its entire length L into space 22. The moving of strip S into slot 20 may be performed manually, by use of a pushing tool, or by automated equipment.

Subsequently, the balancing strip S is attached to the armature. The attachment of strip S is typically a separate processing step from the impregnation of the coils, described above. In a preferred embodiment, described below, the balancing strip S is attached by an adhesive material which secures the strip S to the turns of the coil. Alternatively, the strip S may be attached to the armature by welding, soldering, or other methods where heat or pressure are used. For example, in an alternative embodiment, strip S may be fabricated from tin and welded to the converging portions P of the armature stack. In yet another alternative embodiment, balancing strip S may be attached to a component, such as a mounting member, that has previously been secured to the armature. Attachment to the mounting member may be made with an adhesive material, a weld, or other attachment method, and is described below with respect to FIG. 4.

In a preferred embodiment, an adhesive dispensing unit 23 applies an adhesive material to secure the balancing strip S to the turns of the coil, thus avoiding disconnection or shifting of the strip S during rotation of the armature in the assembled motor. The adhesive may be any material suitable for the purpose of bonding the strip S to the coil, such as the adhesive materials manufactured by LOC-TITE Corporation. The adhesive material is distinguished from the impregnation resin described above, and typically adds negligible mass to the armature. Therefore, it does not significantly change the balance characteristics of the armature.

Adhesive dispensing unit 23 applies an adhesive onto the turns of the coil that will be in contact with the balancing strip S. Since the turns are already impregnated with the resin, they provide a stable mounting location for the balancing strip S. Typically, the adhesive dispensing unit 23 applies the adhesive in the radial direction 19 as shown in FIG. 2, into slot entrance 30, the portion of slots 20 located on the circumferential surface C of the armature, between the converging portions P. Adhesive may be applied to the strip S itself, prior to insertion into the slots 20. Unit 23 applies adhesive to the turns and the strip S after insertion of the strip S to firmly secure it against it against detachment. In addition, the adhesive dispensing unit 23 preferably has a contact surface 23a. Unit 23 may thus move in radial direction 19 toward the balancing strip S and apply pressure to the strip in order to achieve improved adhesion of the strip S with the turns of the coil. Strip S may be knurled by unit 18 to improve the attachment obtained by using the adhesive compound (See, FIG. 1). The movement of adhesive dispensing unit 23 as well as the dispensing of adhesive may be controlled by a controller, such as control unit 19 (FIG. 1).

In those armatures where space 22 is minimal (usually because the slots 20 are greatly filled with coil turns 21), balancing strip S may be formed from a narrower strip of material, so that it can be passed through radial slot entrance 30 between the converging portions P of the armature stack (see, FIG. 3) and be placed on the topmost turns. Balancing strip S is unwound from reel 12 and cut substantially as described above with respect to FIG. 1. Once balancing strip S has been placed on the turns through slot entrance 30, the adhesive compound can be attached as above to obtain a secure attachment.

Figure 4:
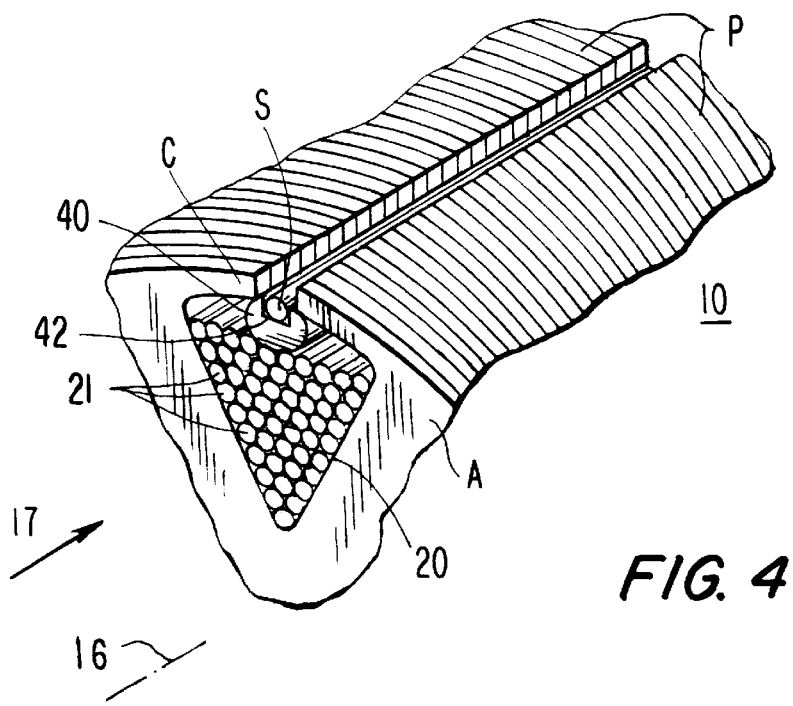
FIG. 4 is a simplified fragmentary perspective view similar to FIG. 2, illustrating another alternative embodiment of the subject invention.

FIG. 4 illustrates another embodiment of the balancing strip S and a device for identifying the attachment location and for anchoring the strip to the armature 10. In this case, an elongated covering, or mounting member 40, is attached to the armature 10, preferably placed in the slot 20 between the topmost wire turns 21 and the converging portions P. Mounting member 40 indicates where the balancing strip S should be attached to balance the armature 10. Such a member 40 may be cylindrical in shape, and may be milled or otherwise processed to define a recess or seat 42, which may receive the balancing strip S. The size of the seat 42, in cross section, should be selected such that the installed strip S is maintained below the circumferential surface C of the stack. This will avoid interference with the magnetic gap of the final motor in which the armature will be assembled. The cross section of the seat 42 may be substantially rectangular in shape (as shown), and the extension of the seat may be parallel to the longitudinal axis 16 of the armature 10. The strip S may be inserted into seat 42 by pushing it through the axial end A of the armature in the direction 17, with a pushing tool, such as has been described with respect to FIGS. 1 and 2, above. Alternatively, the strip S may be inserted in slot entrance 30 between converging portions P, as described with respect to FIG. 3. After the strip S has been positioned in seat 45, it is attached to mounting member according to the methods described above. For example, an adhesive compound may be applied to secure the balancing strip S within the seat 42.

In accomplishing alignment of the armature 10 with respect to the balancing unit, the armature must also be angularly oriented about its longitudinal axis 16 in order to position a predetermined slot 20 for receiving strip S. The position of this slot corresponds to the angular position about axis 16 in which the application of balancing strip S balances the armature.

It may be necessary to apply a plurality of balancing strips in order to compensate for the unbalance of the armature. As shown in FIG. 1, strip S is being applied adjacent to end portion A of the armature stack. A similar mass may be added adjacent end portion B, to perform dynamic balancing of the armature. The slots at the two end portions of the armature stack where the masses are applied may be distinct and opposite to each other, with respect to axis 16. The angular rotation of the armature 10 and placement of multiple balancing strips S may be controlled by an automatic controller, such as control unit 19 (FIG. 1).

Figure 5:
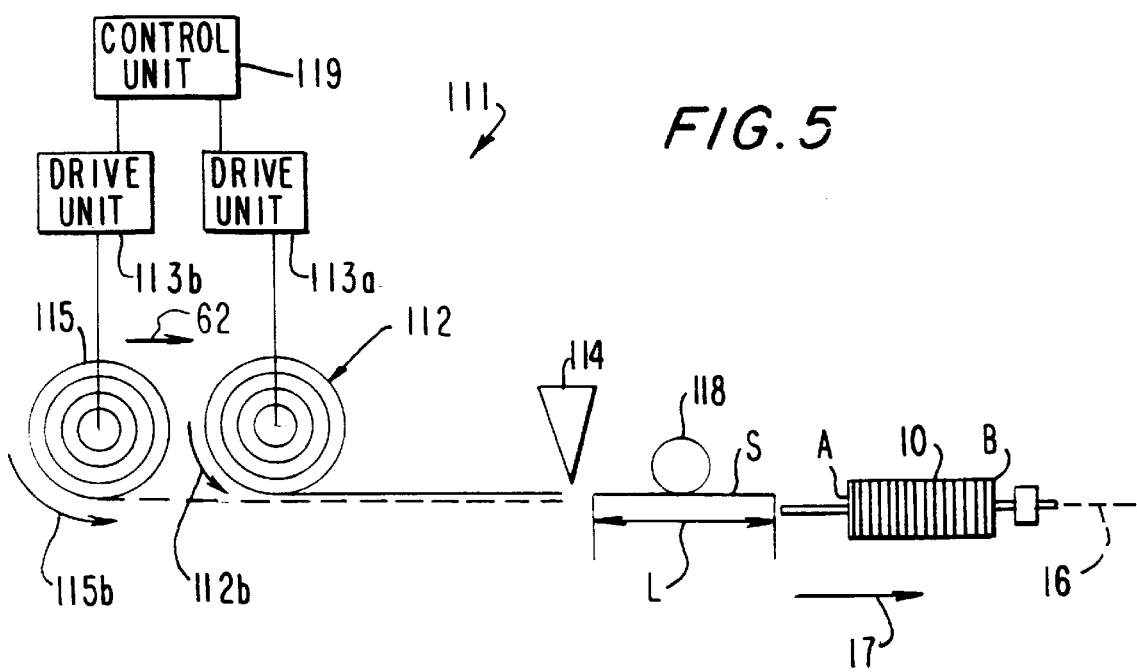
FIG. 5 is a schematic representation, similar to FIG. 1, illustrating an additional alternative embodiment of the subject invention.

Another embodiment of the apparatus is illustrated in FIG. 5. It is desirable that the balancing strip S which has been cut and is to be attached to the armature should fall within a certain maximum and minimum range of lengths. In other words, the strip should not be too short, nor too long, even if it has the predetermined mass. This is important for balancing accuracy, and for causing the strip material to become properly attached to the armature. The apparatus 111 of the alternative embodiment is substantially similar to balancing apparatus 11 (FIG. 1), with the differences noted herein. Apparatus 111 has a plurality of reels 112 and 115 of strip material, each reel substantially identical to reel 12, described above. Although two reels are depicted in FIG. 4, it is contemplated that any number of reels may be selected by one skilled in the art. Each of reels 112 and 115 may be rotated to selectively and incrementally deliver strip material by a respective drive unit 113a and 113b. Alternatively, a single drive unit may be configured to rotate both reels.

Each of the reels 112 and 115 is provided with strip material of different and predetermined cross-section, and consequently different density characteristics. As a result, the apparatus 111 may provide a balancing strip S having the required mass and a length within the desired length range by selecting among the strip materials wound on the various reels 112 and 115. (It is contemplated that if the rotor unbalance and the section characteristics of the available strip materials do not permit the selection of a balancing strip having a length within the desired length range, a length will be selected that is closest to either end of the length range.)

The particular strip material and the associated reel may be selected by control equipment 119. This control equipment is programmed with inputs such as the section characteristics of the various strip materials and the desired strip length range. It thereby selects a section and corresponding strip length to provide the required balancing mass. Control equipment 119 may be used with drive units 113a and 113b to regulate the delivery of the balancing strip.

Reels 112 and 115 may be fixed or movable with respect to each other and cutting unit 114. In one embodiment, reels 112 and 115 may be mounted in close approximation such that the strip material from either reel is advanced to cutting unit 114 without repositioning the reels. As FIG. 4 illustrates, strip material is advanced from reel 112 in direction 112b to cutting unit 114. If required, strip material may be advanced from reel 115 (illustrated in dashed line) in the direction 115b to cutting unit 114 while reel 112 is maintained stationary. Alternatively, a support structure (not shown) may be provided to move each of the reels 112 and 115 into approximation with cutting unit 114. (An exemplary movement of reel 115 is shown by arrow 62.) Where a support structure is used, the control equipment 119 may also cause movement of the support structure in order to position the required reel in position for cutting the balancing strip therefrom.

It will be understood that the foregoing is only illustrative of the principles of the invention, and that various modifications can be made by those skilled in the art without departing from the scope and spirit of the invention. For example, the cross-sections of the balancing masses that have been described are not critical and can be changed if desired. Moreover, although the invention has been illustrated in the context of strips delivered from a reel, the invention is equally applicable to any material-supplying units which can selectively and incrementally deliver a quantity of balancing material to form a balancing mass.

The invention claimed is:

1. A method for balancing a rotor of a dynamo-electric machine, the rotor defining a plurality of slots in which turns of a coil of wire are received, which comprises:

measuring a mass unbalance of the rotor after the turns of the coil of wire have been wound about the rotor;

providing a first material supply configured for selective incremental delivery of material therefrom;

delivering a predetermined section of material from the material supply, the section of material having a mass sufficient to compensate for the mass unbalance of the rotor;

separating the predetermined section of material from the material supply to form a balancing mass; and attaching the balancing mass to the coil of wire within one of the plurality of slots in the rotor to compensate for the mass unbalance.

2. The method defined in claim 1, which further comprises:

prior to measuring the mass unbalance, applying an impregnation resin to the coils of the wire.

3. The method defined in claim 1, wherein the rotor defines a circumferential surface, and wherein attaching the balancing mass to the rotor includes:

attaching the balancing mass within one of the plurality of slots such that the balancing mass does not protrude beyond the circumferential surface.

4. The method defined in claim 1, wherein attaching the balancing mass comprises:

providing a mounting member having a recess that is sized to receive the balancing mass;

attaching the mounting member to the rotor; and mounting the balancing mass within the recess in the mounting member.

5. The method defined in claim 4, wherein the rotor defines a circumferential surface, and wherein attaching the balancing mass further includes:

attaching the balancing mass within the recess in the mounting member such that the balancing mass does not protrude beyond the circumferential surface.

6. The method defined in claim 1, wherein attaching the balancing mass includes:

applying an adhesive to the balancing mass.

7. The method defined in claim 1, which further comprises:

providing a second material supply configured for selective incremental delivery of material therefrom; and selecting one of the first and second material supplies.

8. The method defined in claim 1, which further comprises:

providing a second material supply configured for selective incremental delivery of material therefrom, the second material supply having a different cross-section than a cross-section of the first material supply; and calculating a length of material to form the balancing mass comprising selecting one of the first and second material supplies and calculating a corresponding length of material for the balancing mass such that the length is closest to a predetermined maximum and minimum length range.

9. The method defined in claim 1, wherein the rotor has an end face and defines an axis substantially perpendicular to the end face and having slots located in the end face, and wherein the attaching of the balancing mass to the rotor includes:

inserting the balancing mass in an axial direction into a predetermined one of the slots in the end face.

10. The method defined in claim 1, wherein the rotor has a circumferential surface and defines an axis substantially parallel to the circumferential surface and has slots arrayed radially about the axis and located in the circumferential surface, and wherein the attaching of the balancing mass to the rotor includes:

inserting the balancing mass in the radial direction into a predetermined one of the slots in the circumferential surface.

11. The method defined in claim 1, wherein the rotor defines an axis and has slots arrayed radially about the axis, and wherein the method further comprises:

prior to attaching the balancing mass, angularly rotating the rotor with respect to the axis to position a predetermined one of the slots.

* * * * *